United States Patent
Starostin et al.

(10) Patent No.: US 9,846,692 B2
(45) Date of Patent: Dec. 19, 2017

(54) METHOD AND SYSTEM FOR MACHINE-BASED EXTRACTION AND INTERPRETATION OF TEXTUAL INFORMATION

(71) Applicant: ABBYY InfoPoisk LLC, Moscow (RU)

(72) Inventors: Anatoly Starostin, Moscow (RU); Ivan Smurov, Moscow (RU); Maria Stepanova, Moscow (RU)

(73) Assignee: ABBYY PRODUCTION LLC, Moscow (RU)

( * ) Notice: Subject to any disclaimer, the term of this patent is extended or adjusted under 35 U.S.C. 154(b) by 0 days.

(21) Appl. No.: 14/663,868

(22) Filed: Mar. 20, 2015

(65) Prior Publication Data
US 2016/0224537 A1    Aug. 4, 2016

(30) Foreign Application Priority Data
Feb. 3, 2015   (RU) .................. 2015103468

(51) Int. Cl.
*G06F 17/27* (2006.01)
*G06F 17/30* (2006.01)

(52) U.S. Cl.
CPC .......... *G06F 17/277* (2013.01); *G06F 17/271* (2013.01); *G06F 17/2755* (2013.01); *G06F 17/2785* (2013.01); *G06F 17/30734* (2013.01)

(58) Field of Classification Search
CPC .......... G06F 17/2785; G06F 17/30784; G06F 17/271; G06F 17/2755; G06F 17/277; G06F 17/30734
See application file for complete search history.

(56) References Cited

U.S. PATENT DOCUMENTS

| | | |
|---|---|---|
| 6,085,187 A | 7/2000 | Carter et al. |
| 7,493,333 B2 | 2/2009 | Hill et al. |
| 7,496,593 B2 | 2/2009 | Gardner et al. |
| 7,505,989 B2 | 3/2009 | Gardner et al. |

(Continued)

FOREIGN PATENT DOCUMENTS

WO    2003/042859 A2    5/2003

OTHER PUBLICATIONS

Khoroshevsky, Vladimir, et al. "Ontos solutions for semantic web: text mining, navigation and analytics." Autonomous Intelligent Systems: Multi-Agents and Data Mining. Springer Berlin Heidelberg, 2007. 11-27.*

(Continued)

*Primary Examiner* — Jialong He
(74) *Attorney, Agent, or Firm* — Lowenstein Sandler LLP

(57) ABSTRACT

A method and system of machine-based extraction of information from a text document employ the steps of performing semantic/syntactic analysis for sentences of the document to build semantic-syntactic structures of the sentences; applying production rules to the semantic-syntactic structures to generate a set of logical conclusions about objects of information comprised in the document, wherein the production rules are based on linguistic characteristics and lexical-morphological properties of the semantic-syntactic structures and ontologies of subject matters of the sentences; and using the set of logical conclusions about objects of information comprised in the document to build an ontology-based RDF graph.

16 Claims, 16 Drawing Sheets

(56) References Cited

U.S. PATENT DOCUMENTS

| | | |
|---|---|---|
| 7,668,791 B2 | 2/2010 | Azzam et al. |
| 7,739,218 B2 | 6/2010 | Argüello et al. |
| 7,912,849 B2 | 3/2011 | Øhrn et al. |
| 7,949,676 B2 | 5/2011 | Mori et al. |
| 7,991,760 B2 | 8/2011 | Kolz et al. |
| 8,014,997 B2 | 9/2011 | Huang et al. |
| 8,041,702 B2 | 10/2011 | Eggebraaten et al. |
| 8,065,655 B1 | 11/2011 | Deo et al. |
| 8,069,185 B2 | 11/2011 | Martin et al. |
| 8,140,535 B2 | 3/2012 | Eggebraaten et al. |
| 8,140,557 B2 | 3/2012 | Dettinger et al. |
| 8,145,579 B2 | 3/2012 | Iqbal |
| 8,209,295 B2 | 6/2012 | Faraotti et al. |
| 8,225,380 B2 | 7/2012 | Moshir et al. |
| 8,239,342 B2 | 8/2012 | Ross et al. |
| 8,250,101 B2 | 8/2012 | Fot et al. |
| 8,266,184 B2 | 9/2012 | Liu et al. |
| 8,276,061 B2 | 9/2012 | Joshi et al. |
| 8,285,711 B2 | 10/2012 | Bordawekar et al. |
| 8,316,006 B2 | 11/2012 | Cain et al. |
| 8,335,753 B2 | 12/2012 | Rappaport et al. |
| 8,336,024 B2 | 12/2012 | Kannan et al. |
| 8,433,715 B1 | 4/2013 | Mirhaji |
| 8,484,141 B2 | 7/2013 | Grabarnik et al. |
| 8,566,363 B2 | 10/2013 | Fang et al. |
| 2004/0054690 A1* | 3/2004 | Hillerbrand ............ G06Q 10/06 |
| 2004/0122656 A1 | 6/2004 | Abir |
| 2004/0139095 A1* | 7/2004 | Trastour .................. H04L 69/24 |
| 2005/0065773 A1 | 3/2005 | Huang et al. |
| 2005/0154690 A1 | 7/2005 | Nitta et al. |
| 2005/0234957 A1* | 10/2005 | Olson ....................... G06N 5/02 |
| 2006/0100856 A1 | 5/2006 | Kang et al. |
| 2006/0173868 A1* | 8/2006 | Angele ............. G06F 17/30914 |
| 2007/0112718 A1* | 5/2007 | Liu ........................... G06N 5/02 |
| | | 706/47 |
| 2008/0091405 A1 | 4/2008 | Anisimovich et al. |
| 2009/0055381 A1 | 2/2009 | Wu et al. |
| 2009/0091405 A1 | 4/2009 | Cho et al. |
| 2009/0157401 A1 | 6/2009 | Bennett et al. |
| 2009/0182549 A1* | 7/2009 | Anisimovich ...... G06F 17/2755 |
| | | 704/4 |
| 2009/0254574 A1* | 10/2009 | De .................... G06F 17/30734 |
| 2009/0265686 A1* | 10/2009 | Lucas .................... G06F 9/4436 |
| | | 717/120 |
| 2009/0292716 A1* | 11/2009 | Oliver ................. G06F 17/2785 |
| 2010/0031232 A1* | 2/2010 | Glazier ..................... G06F 8/10 |
| | | 717/106 |
| 2010/0161317 A1 | 6/2010 | Au et al. |
| 2010/0198778 A1* | 8/2010 | Venugopal .......... G06F 17/3089 |
| | | 707/602 |
| 2010/0318558 A1* | 12/2010 | Boothroyd ........ G06F 17/30731 |
| | | 707/769 |
| 2010/0324927 A1* | 12/2010 | Tinsley .................. G06F 19/322 |
| | | 705/2 |
| 2011/0022560 A1* | 1/2011 | Breiter ..................... G06N 5/04 |
| | | 706/47 |
| 2011/0077936 A1 | 3/2011 | Arumugam et al. |
| 2011/0270607 A1 | 11/2011 | Zuev et al. |
| 2012/0109640 A1* | 5/2012 | Anisimovich ...... G06F 17/2755 |
| | | 704/9 |
| 2012/0303668 A1* | 11/2012 | Srinivasan ........ G06F 17/30292 |
| | | 707/792 |
| 2012/0310926 A1 | 12/2012 | Gannu et al. |
| 2013/0066823 A1* | 3/2013 | Sweeney .................. G06N 5/00 |
| | | 706/50 |
| 2013/0066921 A1 | 3/2013 | Mark et al. |
| 2013/0138696 A1 | 5/2013 | Turdakov et al. |
| 2013/0246049 A1* | 9/2013 | Mirhaji ............. G06F 17/30312 |
| | | 704/9 |
| 2014/0114649 A1 | 4/2014 | Zuev et al. |
| 2014/0214852 A1 | 7/2014 | Serebrennikov |

OTHER PUBLICATIONS

Beckett, David. "The design and implementation of the Redland RDF application framework." Computer Networks 39.5 (2002): 577-588.*

Efimenko et al. "Semantic Portals in Biomedicine: Case Study", Workshop Biomedical Information Extraction, Borovets, Bulgaria, 2009.*

Efimenko, Irina, et al. Providing Semantic Content for the Next Generation Web. INTECH Open Access Publisher, 2010.*

Starostin et al., "A Production System for Information Extraction Based on Complete Syntactic-Semantic Analysis", ABBYY Article, 18 pages, ABBYY, Moscow, Russian Federation, Jun. 2014.

* cited by examiner

FIG. 2B

METHOD AND SYSTEM FOR MACHINE-BASED EXTRACTION AND INTERPRETATION OF TEXTUAL INFORMATION

CROSS REFERENCE TO RELATED APPLICATIONS

This application claims the benefit of priority to Russian Patent Application No. 2015103468, filed Feb. 3, 2015; disclosure of which is incorporated herein by reference in its entirety.

FIELD OF THE INVENTION

The present invention relates to extracting and interpreting information from unstructured natural language texts. More specifically, the invention relates to the field of machine extraction and interpretation of information in text documents.

BACKGROUND OF THE INVENTION

Large volumes of unstructured natural language information/data in an electronic format have become more readily available especially on the Internet. Such unstructured natural language information contains various types of textual information, such as natural language text, numbers and data, for example. Machine-based extraction and interpretation of that information is complicated by ambiguity, the variety of real world objects, their properties and connections between those real world objects, as well as by imprecision and variation of language forms and expression. Moreover, machine interpretation of speech in audio and video files is also often desirable.

Due to presence of homonyms and homographs in natural languages, existing computer program products (i.e., application programs) for machine interpretation of information in text documents often incorrectly represent actual meanings of linguistic portions of the documents.

SUMMARY OF THE INVENTION

A method of extracting information as pertinent to a data mining system is an integral part of a universal text analysis technology and its key feature—the ability to perform complete syntactic-semantic analysis of an input text. The method involves processing the text and generating a collection of syntactic-semantic dependency trees. The syntactic-semantic dependency trees are generated by a parser during the analysis of the text. One syntactic-semantic tree corresponds to a sentence in the input text. Textual contents of the input text document presented as syntactic-semantic dependency trees are then processed and output in the form of Resource Description Framework (RDF) graphs using the computer language OWL.

More specifically, a given input text document is first analyzed by a parser. That analysis results in a collection of syntactic-semantic dependency-based parse trees with nodes and edges of each tree being augmented with diverse grammatical and semantic information. The parse tree forest is then used as an input for a production system of information extraction rules. The application of the information extraction rules results in the formation of an RDF graph of the analyzed text consistent with a domain ontology.

The availability of the system to analyze syntactic and semantic structure of a text and method of the present invention allows one to extract facts as well as entities from the text. Fact extraction rules that are applied to the syntactic-semantic trees tend to be laconic yet highly efficient, easily covering most natural language expressions. Also, the present system and method show little dependence on a particular language. Since the parse trees contain language-independent data (like semantic roles or universal (language independent) semantic classes), many extraction rules are universal and can be used for analysis of texts in different languages.

The present system and method of extracting information is not limited to rule-based extraction, because the syntactic and semantic analysis that precedes the extraction is not based on a set of rules. The analysis performed by the parser of the present invention can be defined as model-based: it rests upon a multilevel model of natural language created by linguists and then corpus-trained. Thus, the present method is characterized as hybrid, it being model-based at the first (preparatory) stage and rule-based at the second.

Techniques for machine-based interpretation of information in text documents are disclosed.

Logical conclusions for sentences of a text document are formed and verified using linguistic characteristics and lexical-morphological properties of the semantic/syntactic structures and trees thereof. Data derived from the logical conclusions is used to increase correctness and depths of interpretation of the information and may be included in searchable ontologies of subject matters of the information for further reference.

Various other aspects and embodiments of the disclosure are described in further detail below. It has been contemplated that features of one embodiment of the disclosure may be incorporated in other embodiments thereof without further recitation.

The Summary is neither intended nor should be construed as being representative of the full extent and scope of the present disclosure. All objects, features and advantages of the present disclosure will become apparent in the following detailed written description and in conjunction with the accompanying drawings.

The novel features believed being characteristic of the description are set forth in the appended claims.

BRIEF DESCRIPTION OF THE DRAWINGS

FIG. 2B is an example of a lexical-morphological structure of a sentence according to an embodiment of the present invention;

To facilitate understanding, identical numerals may be used in the drawings to designate, where possible, substantially identical elements that are common to the figures, except that alphanumerical extensions and/or suffixes may be added, when appropriate, to differentiate such elements.

DETAILED DESCRIPTION OF THE INVENTION

Objects, features and advantages of the present disclosure are discussed below in reference to machine-based (i.e., computerized) interpretation of textual information (i.e., information contained in text documents) available in an electronic form in one of natural, or source, languages. It has been contemplated that at least portions of the present disclosure may also be utilized for analysis of other types of documents (e.g., documents containing alpha-numerical data, multi-language documents, etc.).

The output (or the aimed result) of the extraction mechanism according to the present invention is an RDF graph. The concept of an RDF (Resource Definition Framework) is to assign each individual information object a unique identifier and store the information about it in the form of SPO triples. "S" stands for subject and contains the identifier of the corresponding object, "P" stands for predicate and identifies some property of the object, "O" stands for object and stores the value of that property of the object. This value can be either a primitive data type (string, number, Boolean value) or an identifier of another object.

All the RDF data is consistent with an OWL ontology which is predefined and static. Information about situations and events is modelled in a way that is ideologically similar to that proposed by the W3C consortium for modelling N-ary relations. The consistency of the extracted information with the domain model is a built-in feature of the system. It is secured automatically, firstly, due to the extraction rules syntax and, secondly, by validation procedures that prevent generation of ontologically incorrect data.

The present system and method of extracting information uses as its input the already analyzed by syntactic parser text in the form of collection of syntactic-semantic trees. The collection of the syntactic-semantic trees is the result of the deep syntactic-semantic analysis of the source text. Each such corresponds to one sentence of the text. The syntactic-semantic trees are generated by a parser which perform the analysis of the text in according with the method and system described in U.S. Pat. No. 8,078,450, which is incorporated herein by reference in its entirety. Each tree corresponding to a semantic structure has nodes corresponding to the words of the source text.

Figure 1A:
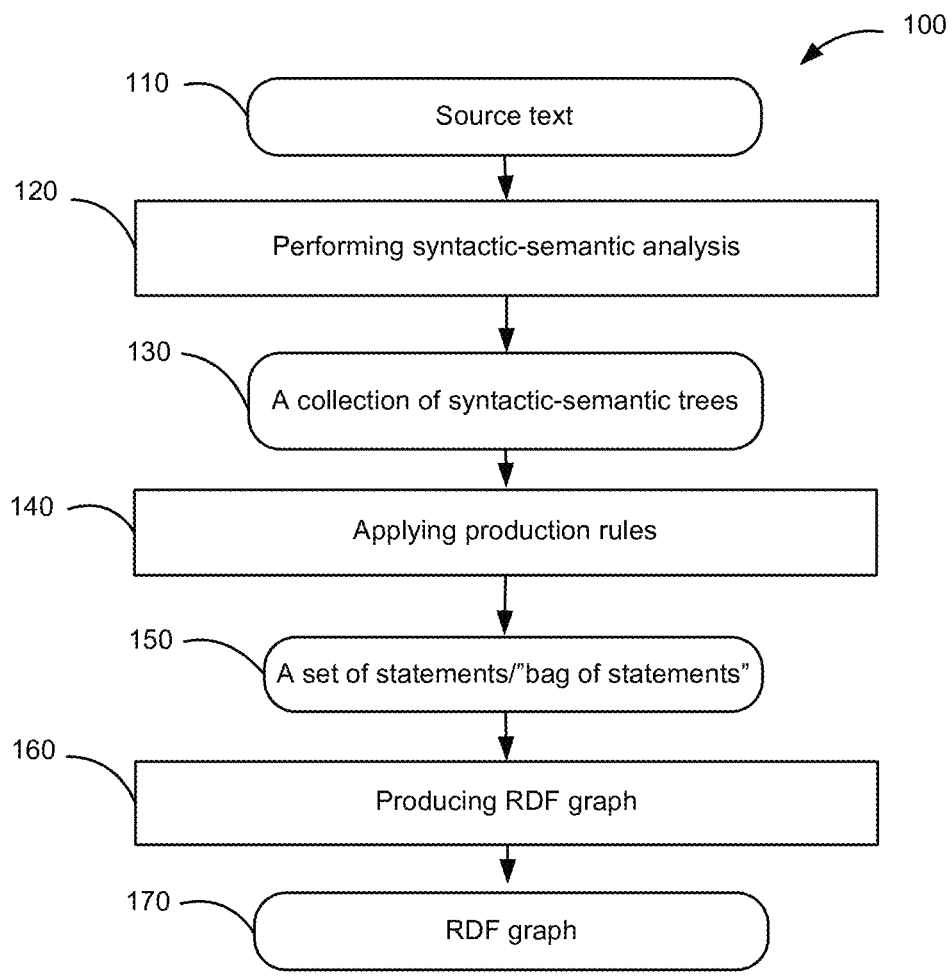
FIG. 1A is a block diagram illustrating a method of the present invention.

Referring not to FIG. 1A, illustrated there is a sequence of steps 100 performed by the system, according to which at step 110 the text document is supplied into the system. At step 120 tools of semantic/syntactic analysis are applied to transform the text document into a collection (130) of independent from a natural language of the document semantic-syntactic structures and trees thereof selectively corresponding to sentences of the document. Then, at step 140, production rules are applied to the collection of semantic-syntactic trees to generate a set of statements about the objects. The information about those objects is contained in the source text. The generated set of statements must be non-contradictory, therefore, a special algorithm for generate that set of statements has been developed while the referenced set of statements has been named a "bag of statements". The "bag of statements" (150) is shown in FIG. 1A. The generated "bag of statements" then serves as an input for construction of RDF graph at step 160. The information extraction method result is the constructed RDF graph (170).

Figure 1B:
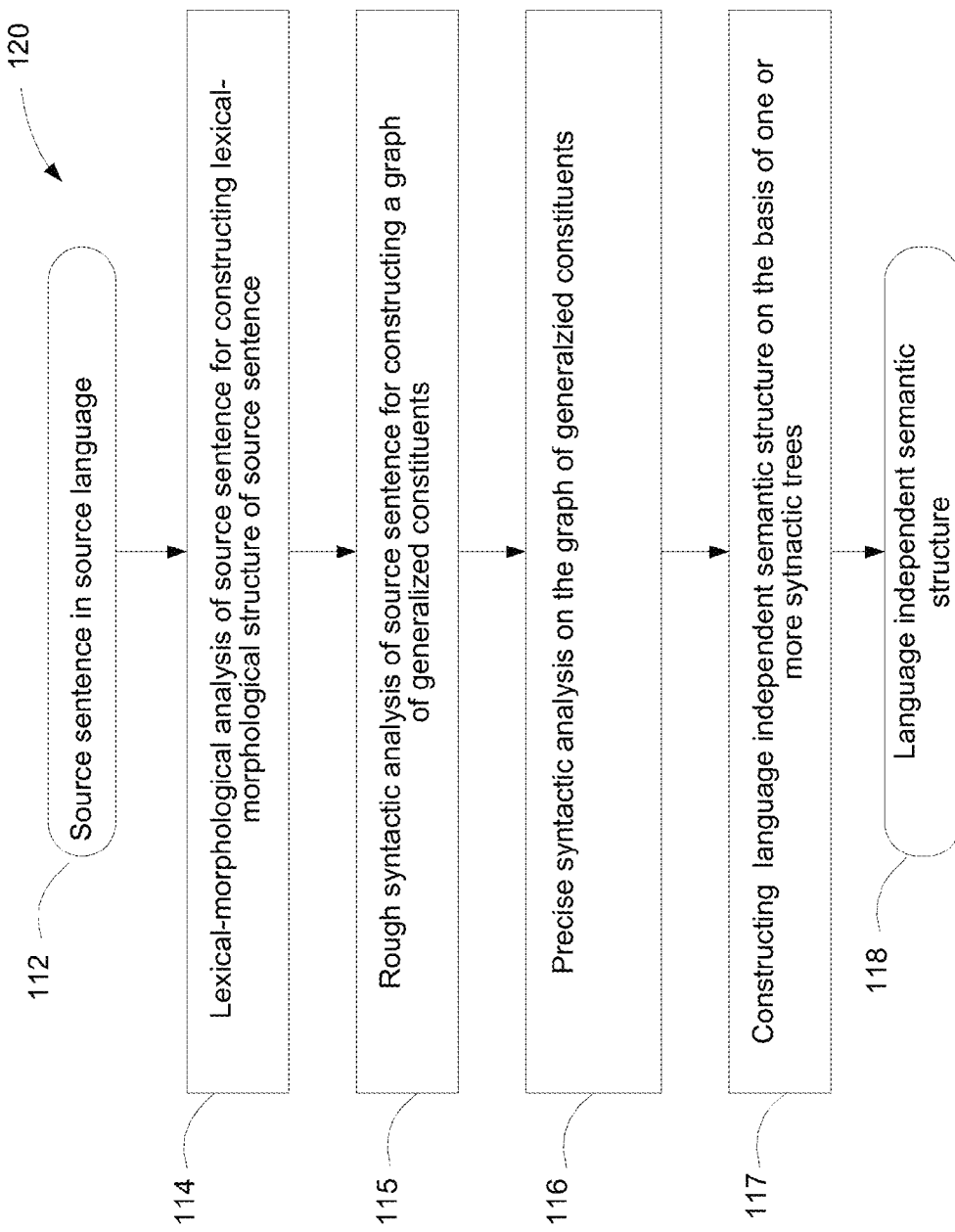
FIG. 1B is a block diagram illustrating a method of producing universal semantic structures from documents according to an embodiment of the present invention.

FIG. 1B illustrates the portion of the inventive method pertaining to semantic-syntactic analysis 120. That analysis 120 is performed by the parser and results in a construction of a deep language-independent structure that can be applicable in different applications, such as, for example, machine translations applications. An information extraction system also utilizes a deep language-independent structure, which makes the rules more generalized and universal. Still, the syntax of the rules allows the system to utilize surface properties of the syntactic tree.

Referring to FIG. 1B, a sources document is provided as input. If the source document is in an image format (such as .pdf, or .tiff, for example), then any non-text document should be OCR-ed or converted into a text document using another conversion method.

At step 114 lexical-morphological analysis for each sentence 112 of the source document is performed to identify morphological meanings of the words in the sentences—each sentence is divided into lexical element after which their lemmas (initial or main forms) are determined, as well as the corresponding variants of grammatical meaning. Usually a plurality of variants is identifies for each such element as a consequence of homonymy and of a coincidence of the word forms of different grammatical meanings A schematic example of the result of step 114 for the sentence <<This boy is smart, he'll succeed in life>> ( Этот мальчик умный, он добьется успеха в жизни ) is shows in FIG. 2B Lexical-morphological analysis of source sentence is performed for constructing lexical-morphological structure of source sentence is then performed. Then a syntactic analysis is performed that is of a two-stage analysis, comprising a Rough syntactic analysis of source sentence for constructing a graph of generalized constituents at step 115 which activates syntactic models of one or more potential lexical meanings of a specific word and establishing all potential surface connections in the sentence. That step results in constructing a data structure called a graph of generalized constituents. Then after step 116 of precise syntactic analysis on the graph of generalized constituents constructing at least one syntactic tree structure constructing a language independent semantic structure takes place at step 117. That process is described in detail in U.S. patent application Ser.

No. 11/548,214, filed on Oct. 10, 2006, issued as U.S. Pat. No. 8,078,450, incorporated herein by referenced in its entirety. In a general case a plurality of such structures is formed, which takes place mainly because of the presence of different variants for lexical choices. Each variant of the syntactic structure is characterized by its own weight. The structures are sorted from more probable to less probable Finally, at step 117 a transition from the selected best syntactic tree to a language independent semantic structure 118 takes place, the nodes of the structure 118 are the semantic classes and the connections reflect semantic relationships.

Figure 2A:
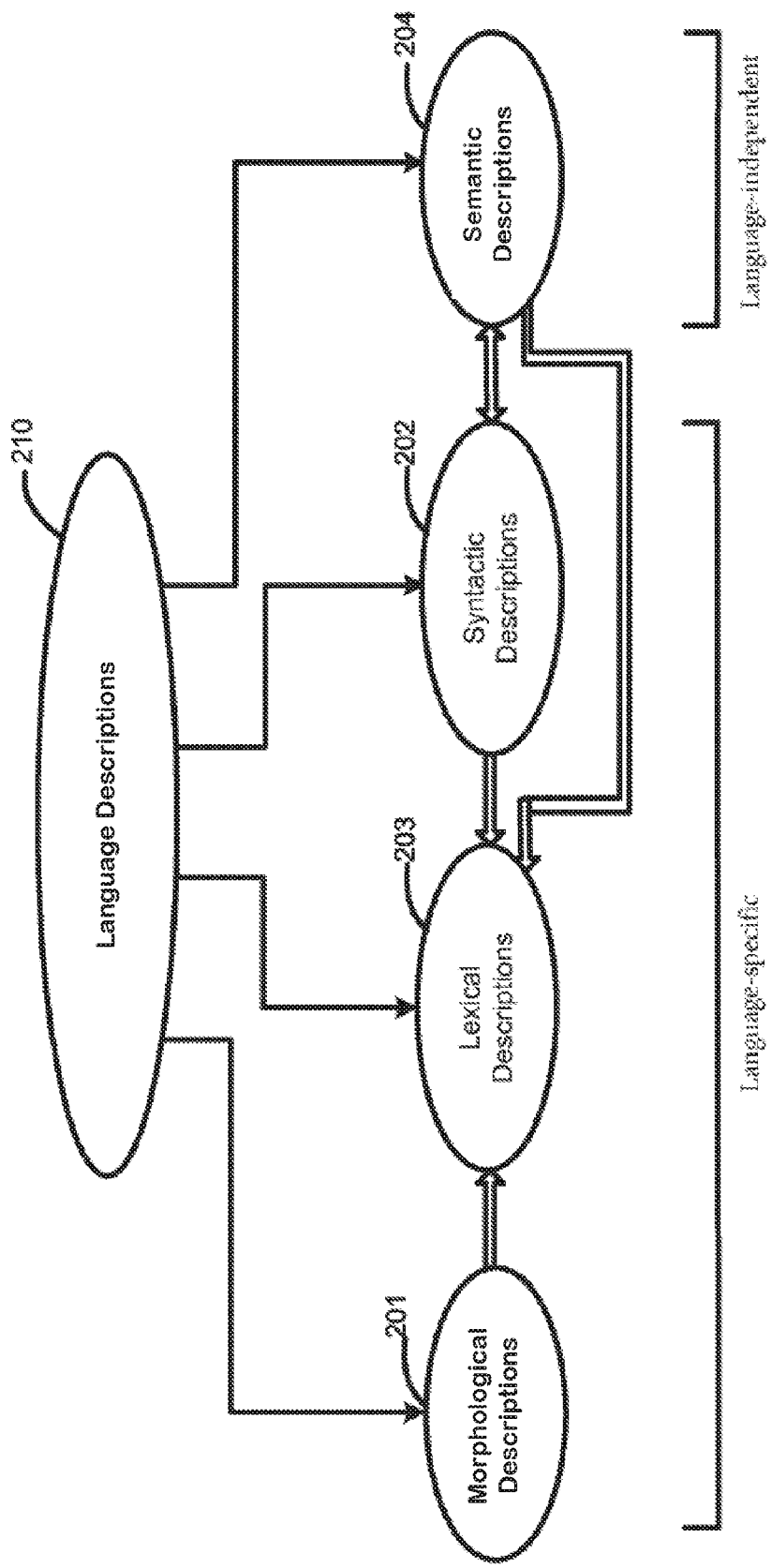
FIG. 2A is an illustration of linguistic descriptions according to an embodiment of the present invention.

A description of a set of the mentioned linguistic descriptions and details of the individual stages of the semantic-syntactic analysis is given below. FIG. 2A is a chart illustrating the required language descriptions (210) according to one of the possible implementations of the invention. Language descriptions (210) include morphological descriptions (201), syntactic descriptions (202), lexical descriptions (203) and semantic descriptions (204).

FIG. 2A illustrates language descriptions 210 including morphological descriptions 201, lexical descriptions 203, syntactic descriptions 202, and semantic descriptions 204, and their relationship thereof. Among them, the morphological descriptions 201, the lexical descriptions 203, and the syntactic descriptions 202 are language-specific. Each of these language descriptions 210 can be created for each source language, and taken together, they represent a model of the source language. The semantic descriptions 204, however, are language-independent and are used to describe language-independent semantic features of various languages and to construct language-independent semantic structures.

Figure 3:
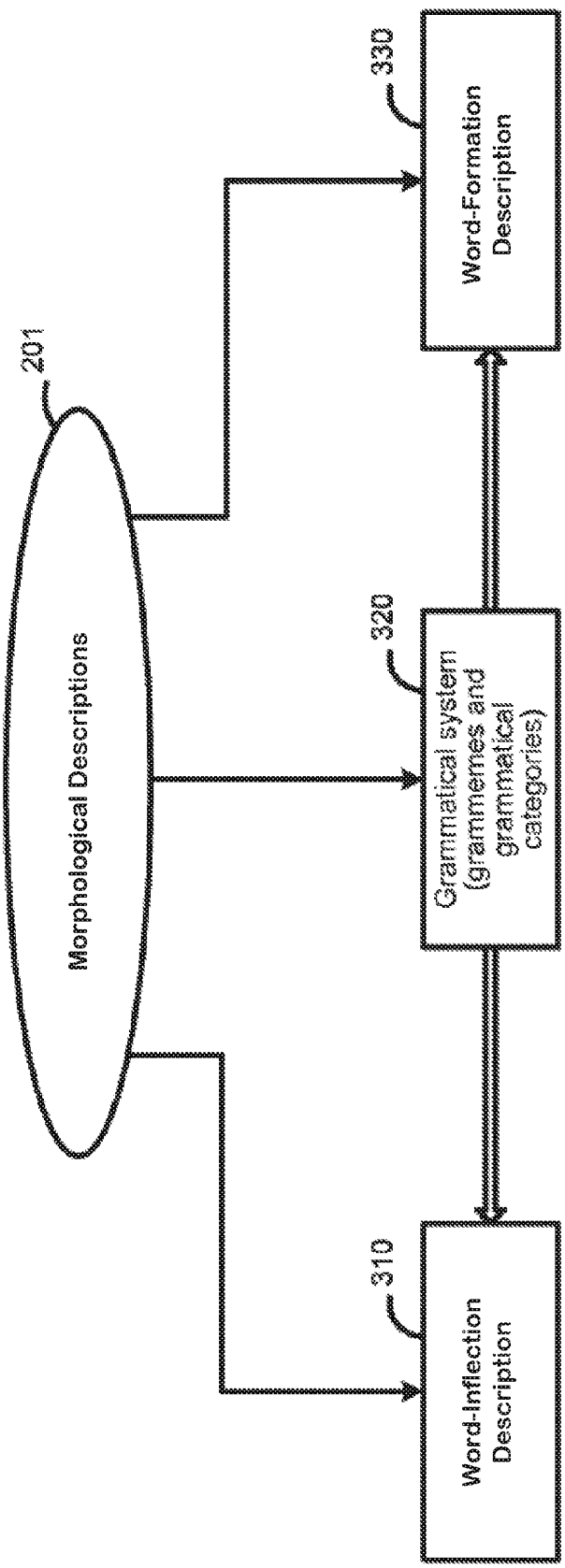
FIG. 3 is an example of morphological descriptions according to an embodiment of the present invention.

FIG. 3 illustrates exemplary morphological descriptions. The components of the morphological descriptions 201 include, but are not limited to, word-inflexion description 310, grammatical system 320 (e.g., grammemes), and word-formation description 330, among others. The grammatical system 320 is a set of grammatical categories, such as, "Part of speech", "Case", "Gender", "Number", "Person", "Reflexivity", "Tense", "Aspect", etc., and their meanings, hereafter referred to as "grammemes", including, for example, Adjective, Noun, Verb, etc.; Nominative, Accusative, Genitive, etc.; Feminine, Masculine, Neuter, etc.; and more.

The word-inflexion description 310 describes how the main word form may change according to its case, gender, number, tense, etc. and broadly includes or describes all possible forms for this word. The word-formation 330 describes which new words may be generated involving this word (for example, there are a lot of compound words in German). The grammemes are units of the grammatical systems 320, the grammemes can be utilized to build the word-inflexion description 310 and the word-formation description 330.

When establishing syntactic relationships for elements of the source sentence, a constituent model is used. A constituent may include a contiguous group of words in a sentence and behaves as one entity. A constituent has a word at its core and can include child constituents at lower levels. A child constituent is a dependent constituent and may be attached to other constituents (as parent constituents) for building the syntactic descriptions of the source sentence.

Figure 4:
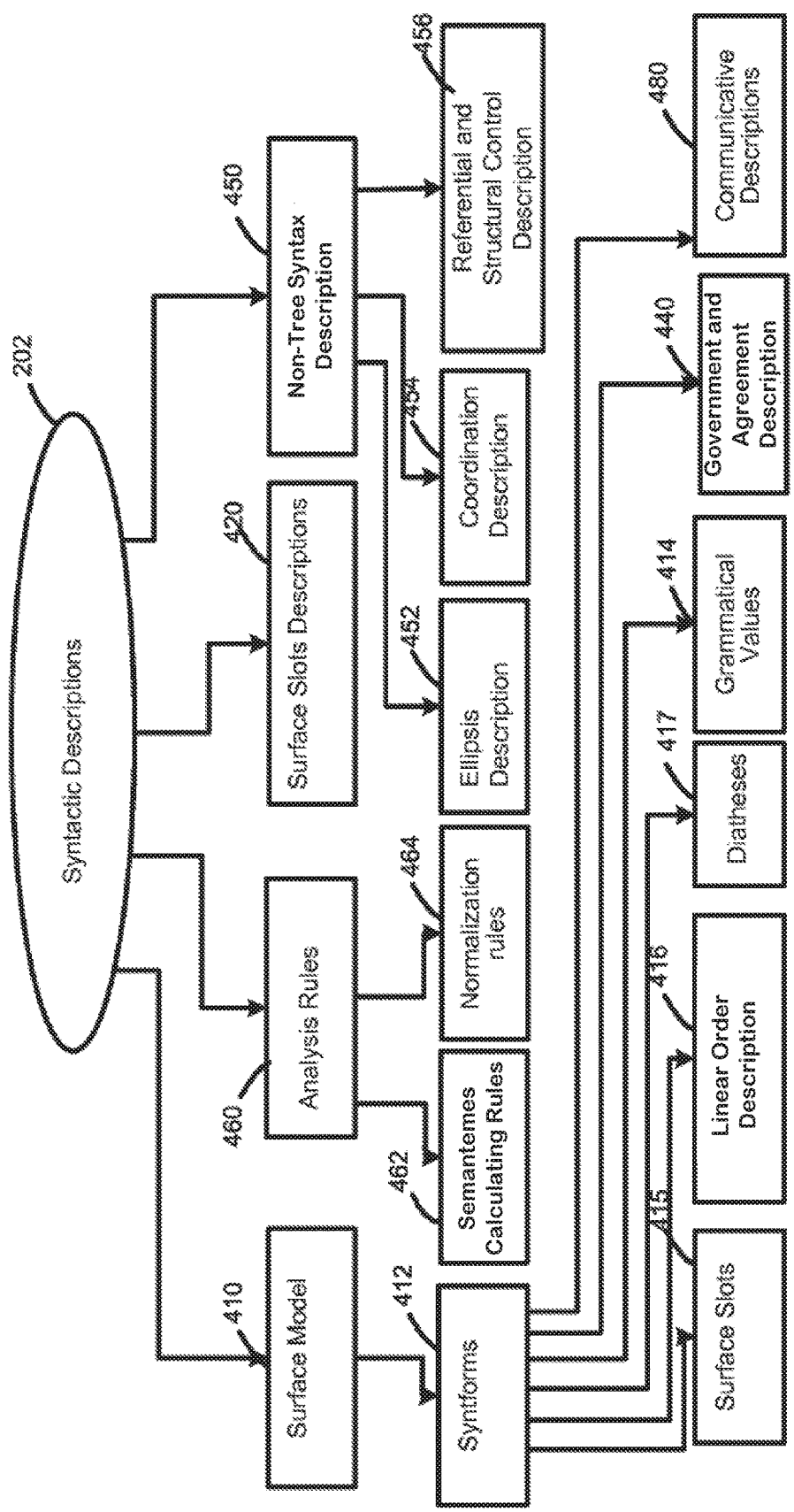
FIG. 4 is an example of syntactic descriptions according to an embodiment of the present invention.

FIG. 4 illustrates exemplary syntactic descriptions. The components of the syntactic descriptions 202 may include, but are not limited to, surface models 410, surface slot descriptions 420, referential and structural control description 430, government and agreement description 440, non-tree syntax description 450, and analysis rules 460. The syntactic descriptions 202 are used to construct possible syntactic structures of a source sentence from a given source language, taking into account free linear word order, non-tree syntactic phenomena (e.g., coordination, ellipsis, etc.), referential relationships, and other considerations.

The surface models 410 are represented as aggregates of one or more syntactic forms ("syntforms" 412) in order to describe possible syntactic structures of sentences as included in the syntactic description 202. In general, the lexical meaning of a language is linked to their surface (syntactic) models 410, which represent constituents which are possible when the lexical meaning functions as a "core" and includes a set of surface slots of child elements, a description of the linear order, diatheses, among others.

The surface models 410 as represented by syntforms 412. Each syntform 412 may include a certain lexical meaning which functions as a "core" and may further include a set of surface slots 415 of its child constituents, a linear order description 416, diatheses 417, grammatical values 414, government and agreement descriptions 440, communicative descriptions 480, among others, in relationship to the core of the constituent.

The linear order description 416 is represented as linear order expressions which are built to express a sequence in which various surface slots 415 can occur in the sentence. The linear order expressions may include names of variables, names of surface slots, parenthesis, grammemes, ratings, and the "or" operator, etc. For example, a linear order description for a simple sentence of "Boys play football." may be represented as "Subject Core Object_Direct", where "Subject", "Object_Direct" are names of surface slots 415 corresponding to the word order. Fillers of the surface slots 415 indicated by symbols of entities of the sentence are present in the same order for the entities in the linear order expressions.

The communicative descriptions 480 describe a word order in the syntform 412 from the point of view of communicative acts to be represented as communicative order expressions, which are similar to linear order expressions. The government and agreement description 440 contains rules and restrictions on grammatical values of attached constituents which are used during syntactic analysis.

The non-tree syntax descriptions 450 are related to processing various linguistic phenomena, such as, ellipsis and coordination, and are used in syntactic structures transformations which are generated during various steps of analysis according to embodiments of the invention. The non-tree syntax descriptions 450 include ellipsis description 452, coordination description 454, as well as, referential and structural control description 430, among others.

The analysis rules 460 as a part of the syntactic descriptions 202 may include, but not limited to, semantemes calculating rules 462 and normalization rules 464. Although analysis rules 460 are used during the step of semantic analysis, the analysis rules 460 generally describe properties of a specific language and are related to the syntactic descriptions 202. The normalization rules 464 are generally used as transformational rules to describe transformations of semantic structures which may be different in various languages.

Figure 5:
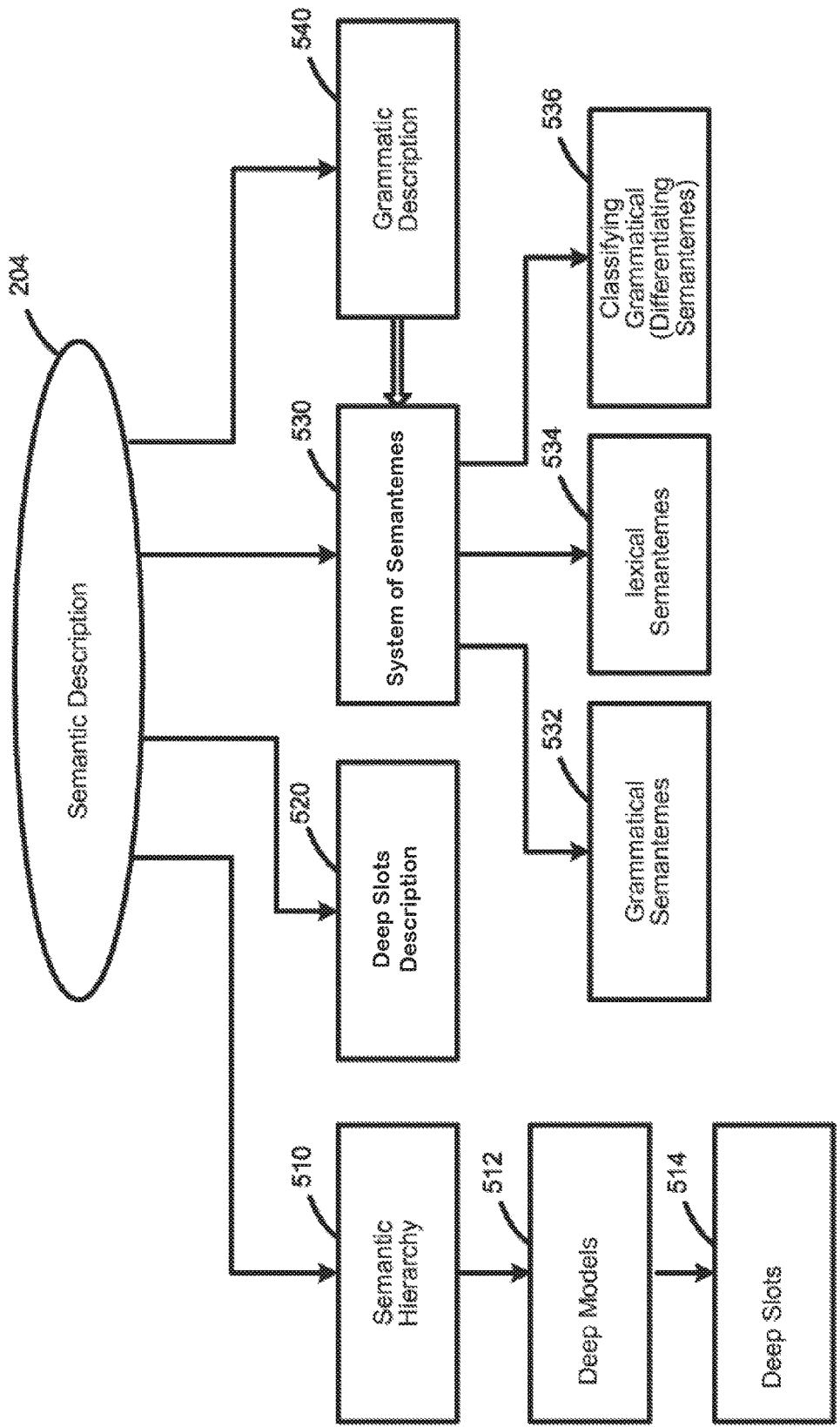
FIG. 5 is an example of syntactic descriptions according to an embodiment of the present invention.

FIG. 5 illustrates exemplary semantic descriptions. The components of the semantic descriptions 204 are language-independent and may include, but are not limited to, a semantic hierarchy 510, deep slots descriptions 520, a system of semantemes 530, and pragmatic descriptions 540.

The semantic hierarchy 510 are comprised of semantic notions (semantic entities) and named semantic classes arranged into hierarchical parent-child relationships similar to a tree. In general, a child semantic class inherits most properties of its direct parent and all ancestral semantic classes. For example, semantic class SUBSTANCE is a child of semantic class ENTITY and the parent of semantic classes GAS, LIQUID, METAL, WOOD_MATERIAL, etc.

Each semantic class in the semantic hierarchy 510 is supplied with a deep model 512. The deep model 512 of the semantic class is a set of the deep slots 514, which reflect the semantic roles of child constituents in various sentences with objects of the semantic class as the core of a parent constituent and the possible semantic classes as fillers of deep slots. The deep slots 514 express semantic relationships, including, for example, "agent", "addressee", "instrument", "quantity", etc. A child semantic class inherits and adjusts the deep model 512 of its direct parent semantic class The deep slots descriptions 520 are used to describe the general properties of the deep slots 514 and reflect the semantic roles of child constituents in the deep models 512. The deep slots descriptions 520 also contain grammatical and semantic restrictions of the fillers of the deep slots 514. The properties and restrictions for the deep slots 514 and their possible fillers are very similar and often times identical among different languages. Thus, the deep slots 514 are language-independent.

The system of semantemes 530 represents a set of semantic categories and semantemes, which represent the meanings of the semantic categories. As an example, a semantic category, "DegreeOfComparison", can be used to describe the degree of comparison and its semantemes may be, for example, "Positive", "ComparativeHigherDegree", "SuperlativeHighestDegree", among others. As another example, a semantic category, "RelationToReferencePoint", can be used to describe an order as before or after a reference point and its semantemes may be, "Previous", "Subsequent", respectively, and the order may be spatial or temporal in a broad sense of the words being analyzed. As yet another example, a semantic category, "EvaluationObjective", can be used to describe an objective assessment, such as "Bad", "Good", etc.

The systems of semantemes 530 include language-independent semantic attributes which express not only semantic characteristics but also stylistic, pragmatic and communicative characteristics. Some semantemes can be used to express an atomic meaning which finds a regular grammatical and/or lexical expression in a language. By their purpose and usage, the system of semantemes 530 may be divided into various kinds, including, but not limited to, grammatical semantemes 532, lexical semantemes 534, and classifying grammatical (differentiating) semantemes 536.

The grammatical semantemes 532 are used to describe grammatical properties of constituents when transforming a syntactic tree into a semantic structure. The lexical semantemes 534 describe specific properties of objects (for example, "being flat" or "being liquid") and are used in the deep slot descriptions 520 as restriction for deep slot fillers (for example, for the verbs "face (with)" and "flood", respectively). The classifying grammatical (differentiating) semantemes 536 express the differentiating properties of objects within a single semantic class, for example, in the semantic class HAIRDRESSER the semanteme <<RelatedToMen>> is assigned to the lexical meaning "barber", unlike other lexical meanings which also belong to this class, such as "hairdresser", "hairstylist", etc.

It should be noted that an important feature of the system and method of the present invention resides in employing universal, language independent features characterized be features, semantic descriptions—semantic classes, semantemes and the like in the rules of extracting the information from a document.

The pragmatic description 540 allows the system to assign a corresponding theme, style or genre to texts and objects of the semantic hierarchy 510. For example, "Economic Policy", "Foreign Policy", "Justice", "Legislation", "Trade", "Finance", etc. Pragmatic properties can also be expressed by semantemes. For example, pragmatic context may be taken into consideration during the semantic analysis.

Figure 6:
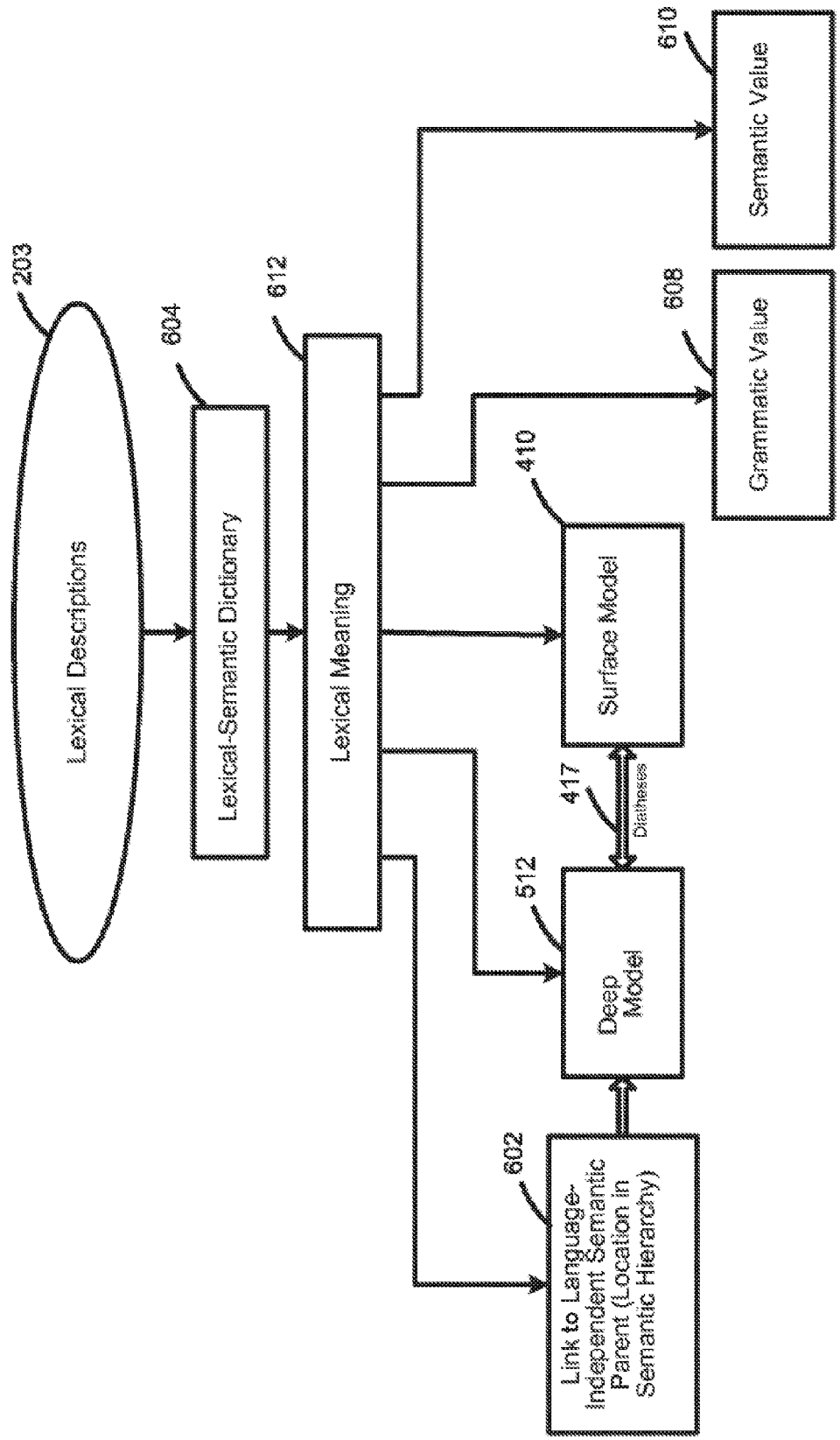
FIG. 6 is an example of lexical descriptions according to an embodiment of the present invention.

FIG. 6 illustrates exemplary lexical descriptions. The lexical descriptions 203 represent a plurality of lexical meanings 612 in a specific language for each component of a sentence. For each lexical meaning 612, a link 602 to its language-independent semantic parent is established to indicate the location of a given lexical meaning in the semantic hierarchy 510.

Each lexical meaning 612 is connected with its deep model 512, which is described in language-independent terms, and surface model 410, which is language-specific. Diatheses can be used as the "interface" between the surface models 410 and the deep models 512 for each lexical meaning 612. One or more diatheses 417 can be assigned to each surface slot 415 in each syntform 412 of the surface models 410.

While the surface model 410 describes the syntactic roles of surface slot fillers, the deep model 512 generally describes their semantic roles. A deep slot description 520 expresses the semantic type of a possible filler, reflects the real-world aspects of the situations, the properties or attributes of the objects denoted by words of any natural language. Each deep slot description 520 is language-independent since different languages use the same deep slot to describe similar semantic relationships or express similar aspects of the situations, and the fillers of the deep slots 514 generally have the same semantic properties even in different languages. Each lexical meaning 612 of a lexical description of a language inherits semantic class from its parent and adjusts its deep model 512.

Figure 2B:
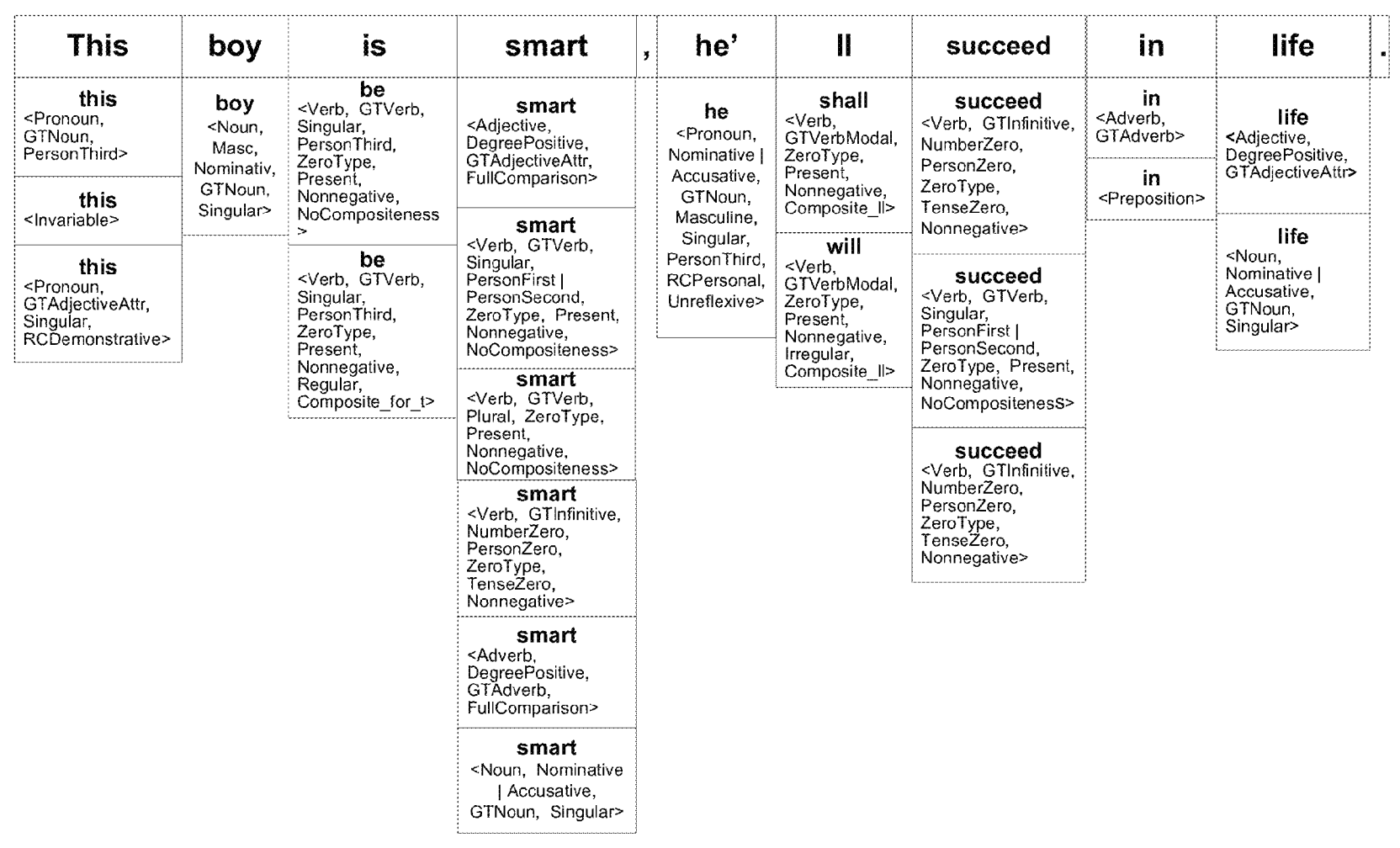
Figure 7:
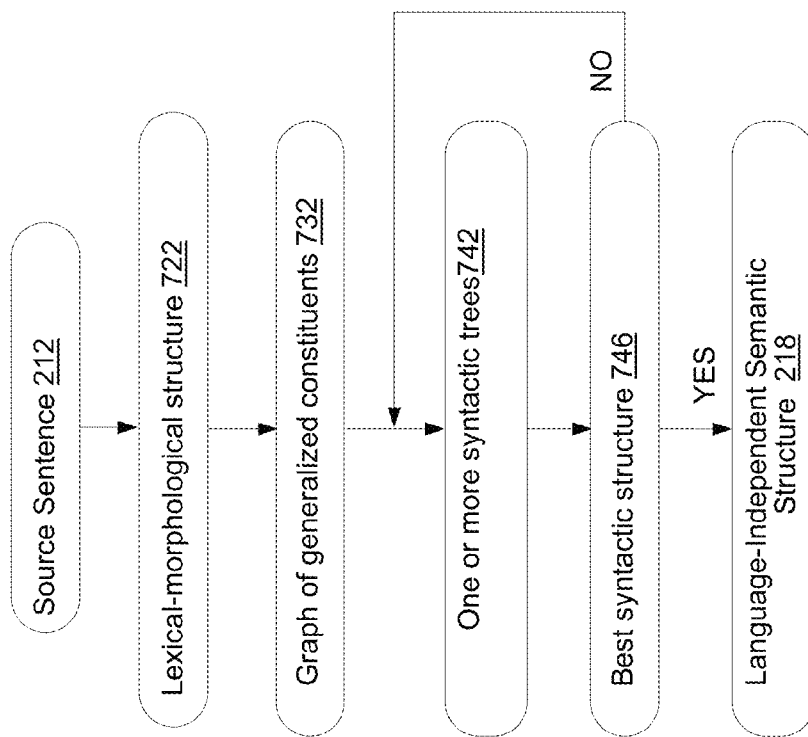
FIG. 7 is a block diagram illustrating a sequence of data structures according to an embodiment of the present invention.

FIG. 2B, shows the main steps of the process of semantic-syntactic analysis. Furthermore, FIG. 7 shows the sequence of data structures generated during such analysis.

Initially, at stage 112 the source sentence of the source language is subjected to Lexical-Morphological Analysis to build the Lexical-Morphological Structure 722 of the source sentence. The Lexical-Morphological Structure 722 is the set of all possible pairs of "lexical meaning—grammatical meaning" for each lexical element (word) in the sentence. An example of such Structure is shown in FIG. 2B Then the first stage of syntactic analysis is done in the Lexical-Morphological Structure—Rough Syntactic Analysis 115 of the Source Sentence to Generate a Graph of Generalized Constituents 732. During Rough Syntactic Analysis 720, for each element of the Lexical-Morphological Structure 722, all the possible syntactic models for this lexical value are applied and checked to find all the potential syntactic links in the sentence, which is expressed in the graph of generalized constituents 732.

The graph of generalized constituents 732 is an acyclic graph in which the nodes are generalized (meaning that they store all the variants) lexical values for words in the sentence, and the branches are surface (syntactic) slots expressing various types of relationships between the combined lexical values. All possible surface syntactic models are activated for each element of the lexical-morphological structure of the sentence as a potential core for the constituents. Then all the possible constituents are prepared and generalized into a graph of generalized constituents 732. Correspondingly, all the possible syntactic models and syntactic structures for the source sentence 212 are examined and a graph of generalized constituents 732 based on a set of generalized constituents is constructed as a result. The graph of generalized constituents 732 at the surface model level reflects all the potential links between words of the source sentence 212. Because the number of variations of a syntactic breakdown can be large in the general case, the graph of generalized constituents 732 is excessive and has a great number of variations—both for selecting the lexical value for the vertex and for the surface slots for the graph branches.

The graph of generalized constituents 732 is initially constructed as a tree, from the leaf nodes to the root (from bottom to top). Constituents are produced from bottom to top by adding child constituents to parent constituents by filling surface slots 415 of the parent constituents in order to cover all the initial lexical units of the source sentence 212.

Figure 8:
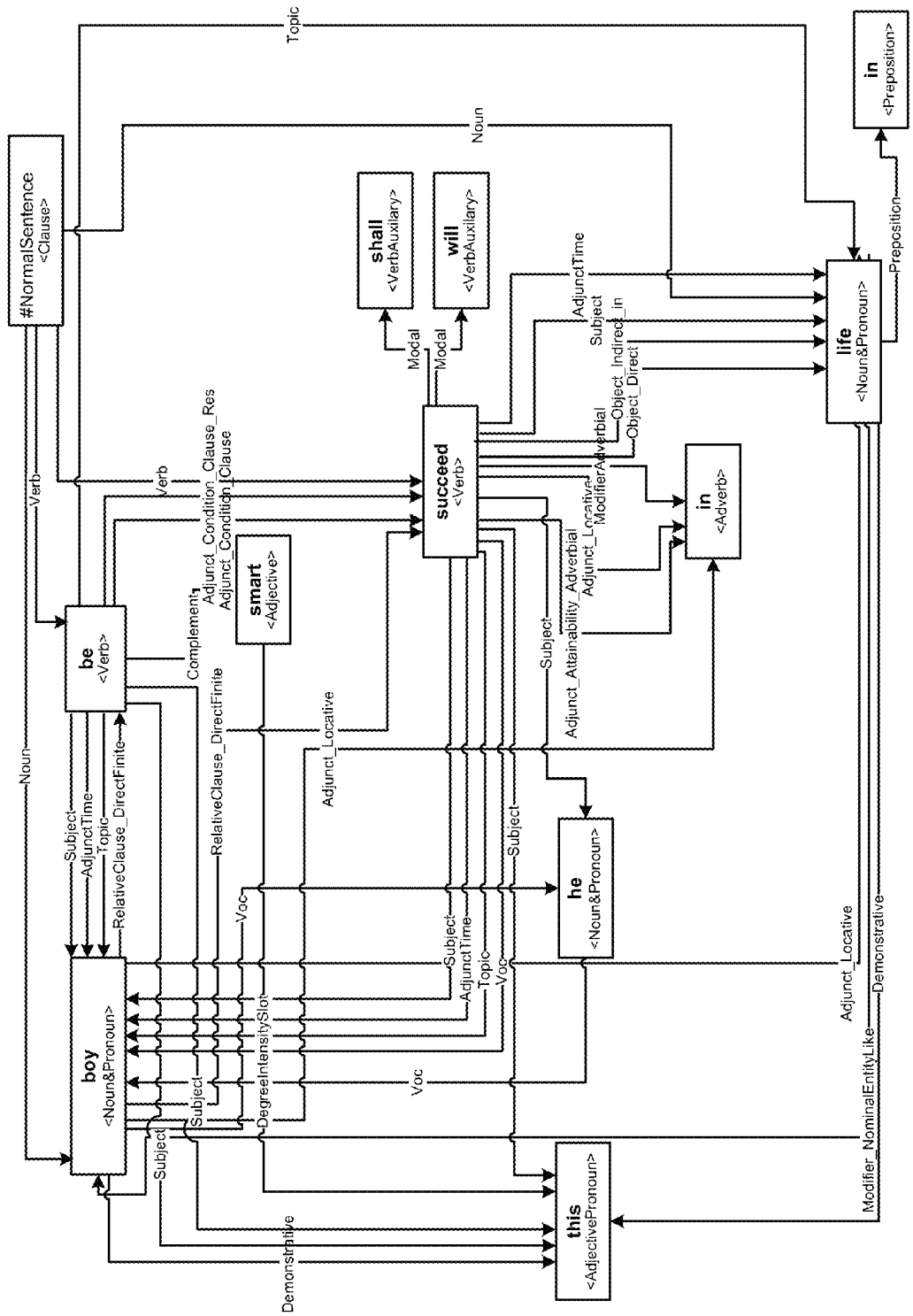
FIG. 8 is an illustration of a graph of generalized constituents of a sentence in the English language according to an embodiment of the present invention.

The root of the tree, which is the graph's 732 main node, usually represents a predicate. During this process, the tree usually becomes a graph because the lower-level constituents (leaves) may be included in various higher-level constituents (root). Some constituents that are constructed for the same constituents of the lexical-morphological structure may be later generalized in order to produce generalized constituents. Constituents are generalized based on lexical values 612 or grammatical values 414, such as those based on the same parts of speech. FIG. 8 shows a schematic example of a graph of generalized constituent for the previously referenced sentence <<This boy is smart, he'll succeed in life>> (Этот мальчик умный, он добьется успеха в жизни).

Precise syntactic analysis 116 is performed to separate the syntactic tree 742 from the graph 732 of generalized constituents. One or more syntactic trees are constructed and for each of them an integral rating is computed based on the use of a set of a priori and calculated ratings; The tree with the best rating is selected to build the best syntactic structure 746 for the source sentence. The syntactic trees are generated as a process of advancing and checking hypotheses about a possible syntactic structure for a sentence, wherein hypotheses about the structure of parts of the sentence are generated as part of the hypothesis about the structure of the entire sentence.

During the conversion from the chosen tree to the syntactic structure 746, non-tree links are established. If non-tree links cannot be established, then the next highest-ranked syntactic tree is selected and an attempt is made to use it to establish non-tree links. The result of the precise analysis is the best syntactic structure 746 for the sentence being analyzed.

In stage 117, there is a transition to a language-independent semantic structure 218 that expresses the meaning of the sentence in universal language-independent concepts. The language-independent semantic structure of the sentence is represented as an acyclic graph (trees, supplemented by non-tree links) where each word of a specific language is replaced with universal (language-independent) semantic entities called semantic classes here. The transition is performed using semantic descriptions 510 and analysis rules 460, which yield a structure in the form of a tree or a graph with a top node, in which the nodes are semantic classes that have an attribute set (attributes express the lexical, syntactic, and semantic properties of specific words in the source sentence) and the arcs are deep (semantic) relationships between the words (nodes) they connect.

Figure 9:
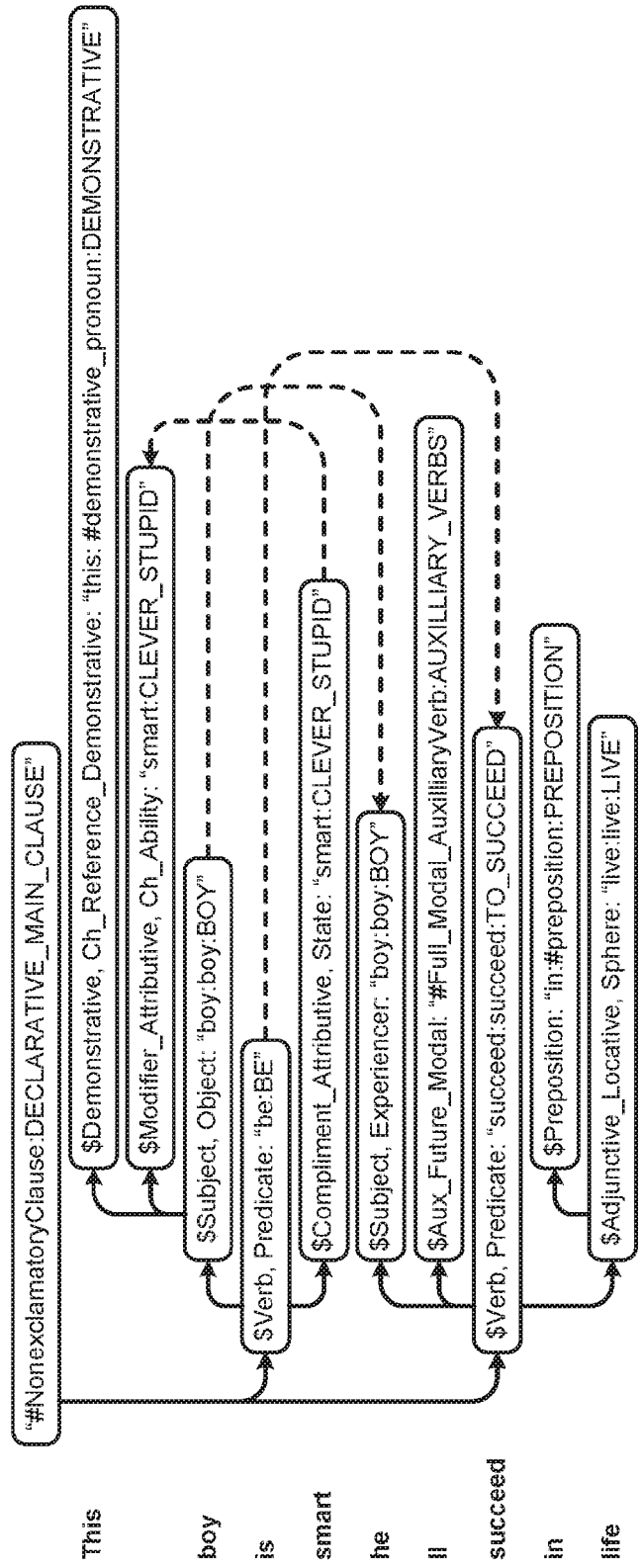
FIG. 9 is an illustration is a syntactic structure of the sentence from FIG. 8 according to an embodiment of the present invention.
Figure 10:
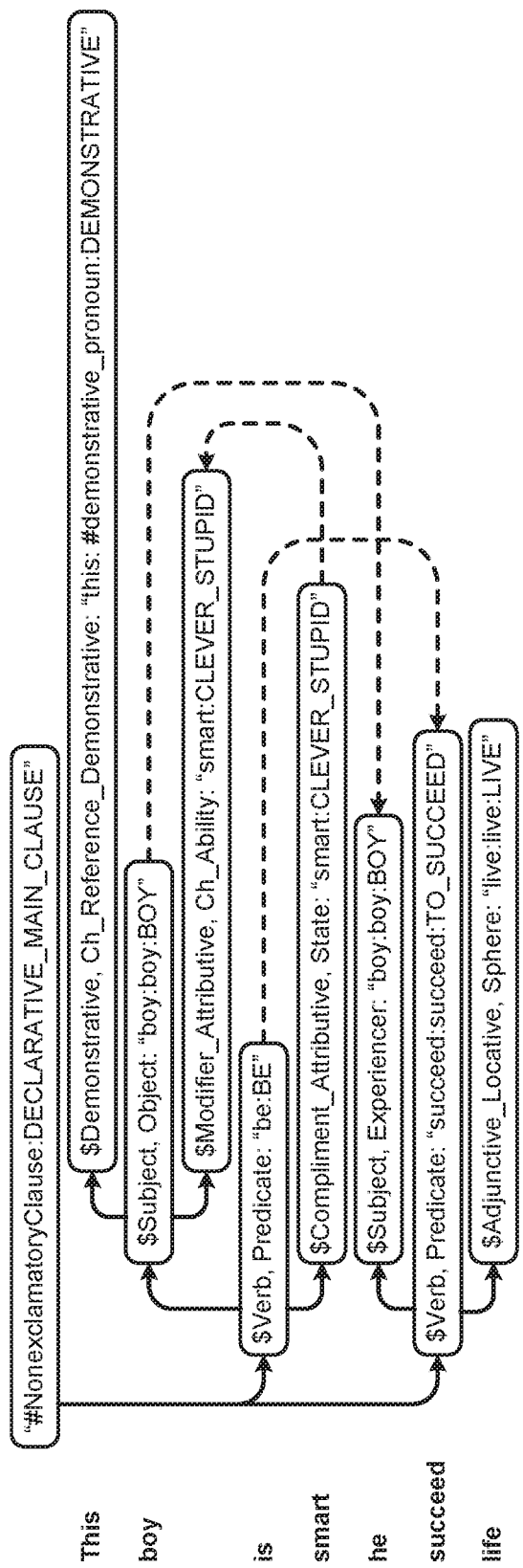
FIG. 10 is an illustration is a semantic structure of the sentence from FIG. 8 according to an embodiment of the present invention.

Construction of a language semantic structure 117 ends at step 118 of constructing the semantic structure. FIG. 9 shows an example of the syntactic structure of the referenced English language sentence <<This boy is smart, he'll succeed in life>> (Этот мальчик умный, он добьется успеха в жизни), and FIG. 10 shows the corresponding semantic structure.

An annotated RDF graph is generated at the very final stage of the information extraction process, while a more complex structure to store information is used during the process. This structure can be described as a set of noncontradictory statements about information objects and their properties, called a "bag of statements".

The above-referenced annotated RDF graph can also be viewed as a bag of statements, if each SPO triple and each link from an object to a segment of text is considered a statement about that object. But, there exists a difference between the temporary information storage structure (the inner structure) and the final output in the form of an RDF graph. The main distinction is that the statements from the inner structure can be used to create functional dependencies, i.e. some statements may depend on the presence of other properties and/or dependences. For instance, a set of values of a certain object's property may contain a set of values of some other property of a different object. If the set of values of the second object is changed, the first object's property changes as well. Such statements (which use functional dependencies) will be hereinafter referred to as dynamic statements. Another difference of the inner structure is that it may contain some auxiliary statements that do not comply with the final annotated RDF graph structure and are used only during the extraction process.

Here is the list of the possible statement types:

1. Cumulativity. Statements can be added to but not removed from a bag.

2. Consistency. All the statements in a bag are non-contradictory to each other.

3. Consistency with ontology. A bag of statement can anytime be converted into an annotated RDF graph consistent with certain ontology.

4. Transactionality. Statements are added in groups, and if any statement of a group contradicts other statements from the bag, the addition of the whole group is cancelled.

Here is the list of statement types:

1. Existence Statements

Existence statements proclaim the existence of information objects and assign unique identifiers to them.

2. Class Membership Statements

Statements that attribute objects to classes in the ontology. OWL allows us to attribute a single object to several classes, so there can be more than one class membership statement in the bag. The only restriction is that the classes should be consistent with each other, i.e. there should not be a DisjointWith statement blocking the combination of classes. The system checks for disjoint every time statements are added to the bag and prevents inconsistencies. Class membership statements can be dynamic: an object is attributed to the same set of classes as some other object.

3. Property Statements

Statements that define properties of an information object. In a property statement a set of values of an object's property includes some particular value. To comply with the RDF standard it can be either an identifier of a different object or a primitive data type (a string, a number or a Boolean value). In the disclosed system parse tree node identifiers are used as property values (an additional primitive data type). Properties of this sort are only used during the extraction process but do not appear in the final RDF graph.

Property statements can be dynamic. The complexity of functions that calculate values of objects from certain properties of other objects can vary. The simplest example is a function that copies values (i.e. it makes a statement that a set of values of some property of an object includes all the values of some other property of a different object). A complex example is a function that generates a normalized string from a set of parse tree nodes. This function relies on the text generation module.

Together several statements of some property of an object can create ontological inconsistencies. For instance, the number of values may exceed the maximal cardinality of that property. The module prevents such inconsistencies by rejecting any group of statements that provokes contradiction.

4. Annotation Statements

Annotation statements connect information objects to parts of the original input text. Annotation coordinates are calculated from the bounds of syntactic-semantic tree nodes. Annotation can cover either a single node (i.e. a word), or a full subtree of that node.

The bag of statements can contain a number of annotation statements. This means that an annotation of an object can consist of more than one segment (i. e. be discontinuous).

Annotation statements can be dynamic. For instance, an annotation can be copied from a different object or be generated from a set of values of a certain property if these values contain links to parse tree nodes.

Annotation statements cannot create any contradictions.

5. Anchor Statements

Anchor statements are a very important part of our information extraction mechanism. Statements of this type link information objects to parse tree nodes, which enables one to access these objects later during the extraction process. The term 'anchor' was coined when the system was in development so that the links between objects and tree nodes could be easily referred to. One object can be anchored to a set of nodes via a number of anchor statements.

The interpreter of the information extraction rules (which are described below) deals with these anchors in a special way: the left-hand side (or condition side) of a rule in the system can contain the so-called object conditions, which imply that an information object of a certain type must be assigned (anchored) to a certain parse tree node for the successful application of the rule. If such an object is found it can be accessed and modified during the application of the right-hand side of the rule.

Object conditions are most widely used in the rules that extract facts, but they are quite useful with named entities as well, since they make it possible to break the extraction of entities of particular type down to several simple stages. For instance, one rule might only create an unspecified Person entity, while the following ones add properties like first name, surname, middle name and alike. It has also become quite common to create auxiliary objects which serve as dynamic labels of parse tree nodes. First some rules create these auxiliary objects and anchor them to certain nodes, and then other rules check for the presence of these objects with the help of object conditions in their left-hand sides.

An anchor statement can attach an anchor not only to the explicitly indicated node, but also to all its coreferring nodes (via non-tree links of syntactic-semantic trees). This possibility is crucially important for the recall of fact extraction, since the extracted information objects are automatically linked to coreferents. As a result the object appears simultaneously in several contexts and can be used by fact extraction rules.

Anchor statements cannot create any contradictions.

6. Identification Statements

During the extraction process it is often possible to recognize information objects which actually refer to a single real-life entity and should therefore be merged. One obvious example is when a person appears several times in a text. At the first stage each mention of that person is extracted as a separate information object, but they can be merged subsequently if their surnames and names match.

Two objects can be merged into one via identification statements. After these statements are added to the bag, all statements about the merged objects are reassigned to this newly created composite object.

Identification statements can contradict to other types of statements. For example, classes of two objects can be incompatible with each other or a value of some property might exceed its maximum cardinality restriction that is set in the ontology. There is also a possibility of other, more complex inconsistencies.

7. Functional Restrictions

In some cases it is convenient to impose a restriction upon a group of information objects. A function that accepts identifiers of information objects and some constant values (e.g. identifiers of parse tree nodes) as input and returns a Boolean value may be added. A function must be true when it is added to the bag. After it has been added no statement that would make the function false can enter the bag.

Figure 11:
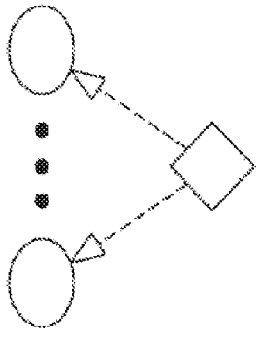
FIG. 11 is a schematic illustration of types of statements according to an embodiment of the present invention.

FIG. 11 shows schematic diagrams of all statements types used in the information extraction process. Diamonds represent information objects (for example, individuals, entities, persons, locations, organizations, facts, etc.), ellipses represent classes (or concepts) and rectangular boxes represent parse tree nodes.

As mentioned above, the statements can be dynamic, i.e. they can depend on other statements. It is important to note that this feature can lead to contradictions caused by the dependent statements rather than the statement being added at the moment. That fact posed certain difficulties to the realization of an algorithm that emulates the bag of statements. However, all these issues were subsequently addressed.

Most of the consistency checking is performed when statements are added to the bag. However some tests can only be conducted after the information extraction process is over. For instance, it may be unknown whether some property meets minimum cardinality requirement until all the rules are executed. After the extraction process is complete and before the bag of statements is converted into an annotated RDF graph some auxiliary information (e.g. auxiliary objects or properties) is filtered.

Now that the way information is stored during the extraction process is clear, we proceed to the description of the mechanism that implements the extraction rules and produces statements on information objects.

Information extraction process is controlled by the production rule system. There are two types of rules in the system: parse subtree interpretation rules (or simply interpretation rules) and identification rules. Both types of rules are described further in the disclosure. Since interpretation rules are much more frequent, whenever the exact type of a rule is not specified, an interpretation type is assumed.

During the development of the extraction mechanism several goals were pursued. In the first place, the intention was to exploit such advantages of the production rule systems as modularity and separation of knowledge from the procedure. Secondly, an efficient deterministic inference model is implemented. Speaking in terms of traditional production systems we can define parse tree forest and the bag of statements as a knowledge base, while the extraction process itself can be described as a forward chaining inference process. Generally speaking, there is no guarantee that the rule execution will not loop. However, if the cycle occurs in the real rule system that definitely means that there is a logical mistake in some rule. Usually, it can be easily found and corrected, since there is a built-in heuristics in the algorithm allowing us to detect rules which caused cycles.

Interpretation rules enable to specify fragments of parse trees, which must be discovered for certain logical statements to become true. A rule is basically a production with syntactic-semantic tree patterns in its left-hand side and some expressions that make statements on information objects in the right-hand side.

Parse tree templates (hereinafter tree templates) are formulas each individual element of which checks some property of a tree node (e.g. presence of a certain grammeme or semanteme, belonging to a certain semantic or lexical class, occupation of a certain deep or surface slot and many other properties available from the parsing results). Apart from the basic logical operators (conjunction, disjunction, negation) tree templates allow to check relative position of nodes within a tree. For instance, it is possible to check if a node is in a subtree of another node.

In most cases tree templates describe the interconnected segments of syntactic-semantic trees (i.e. subtrees). The only exception is a special anaphoric condition. This condition allows to search nodes in the left context of a certain node completely ignoring tree structure and surpassing boundaries of a single sentence. Such rules are used for coreference resolution, especially in cases of nominal anaphora.

Tree templates can contain conditions that require an information object to be anchored to a certain node of a parse tree. Such requirements positive object conditions are called. The rules also support negative object conditions that require a node not to have an object of a certain type attached to it. Object conditions have already been mentioned in the part about anchor statements.

When a statement is added to the right-hand side of a production, it is often necessary to refer to the nodes of the subtree that matches the template in the left-hand side and sometimes to the information objects attached to these nodes. For that purpose names (or variables) for separate parts of tree templates are introduced. If a certain subtree matches a template, its nodes can be accessed via the variables assigned to the template parts. These variables can be used in the right-hand side of a production to make statements on objects. In some cases they can also be accessed in the left-hand side (in order to create a complex condition that checks for certain dependence between several tree nodes). A variable can be either a set variable or a unique one. A set variable can be associated with several nodes, while a unique variable can only hold one node as its value.

To access an information object that matched a positive object condition we use a special notation "X.o" where X is the name of the unique variable assigned to the node at which the condition was introduced. The variable X has to be unique since each time we process the object-condition during the interpretation of the rule we need to know the exact tree node the information object must be anchored to.

Identification rules are used to merge (unite) a pair of objects. An identification rule is basically a production with object conditions for two objects in the left-hand side. If a pair of objects fulfils these conditions, the objects are merged into one. The right-hand side of an identification rule is omitted because it is always the same: a statement that the two objects are identical (an identification statement).

We use three types of conditions in the identification rules. Conditions of the first type describe the properties of the objects separately, while those of the second and the third allow to impose restrictions on both objects simultaneously (first and foremost, the intersection of values of certain properties). Conditions of the first type are written in the same syntax as the object conditions in the interpretation rules. Conditions of the second type are formulae with property intersection statements as basic element and conjunction and disjunction as logical operators. Such formulas can efficiently filter the number of potentially identical objects. Conditions of the third type are functions written in a JavaScript extension. If such a function is present, the rule will only be applied if it returns true.

A significant difference of identification rules from interpretation rules is that the former can operate only with information objects and have no access to parse tree nodes. We assume that all the information necessary for the identification should be stored within the properties of objects (including auxiliary properties unavailable to the end user).

An example of an interpretation rule is presented as follows.

A matching of a tree template with a segment of a tree can be represented as a pair <r, Vr>, where r is the unique identifier of a rule and Vr is a set of mappings where Each set variable of a rule r is associated with a set of syntactic-semantic tree nodes.

Each unique variable is associated with precisely one node.

Each unique variable with a positive object condition holds an information object.

It is important to point out that finding a matching is a sufficient condition for the right-hand side of the rule to be converted into a set of statements.

For identification rules a matching is a triple <r,o1,o2>, where r is the identifier of a rule and o1 and o2 are the information objects. These objects correspond to the first and the second object condition respectively. As in the interpretation rules, if there is a specific matching found for an identification rule, it becomes possible to process its right-hand side, i.e. to make an identification statement about the two objects.

Figure 1C:
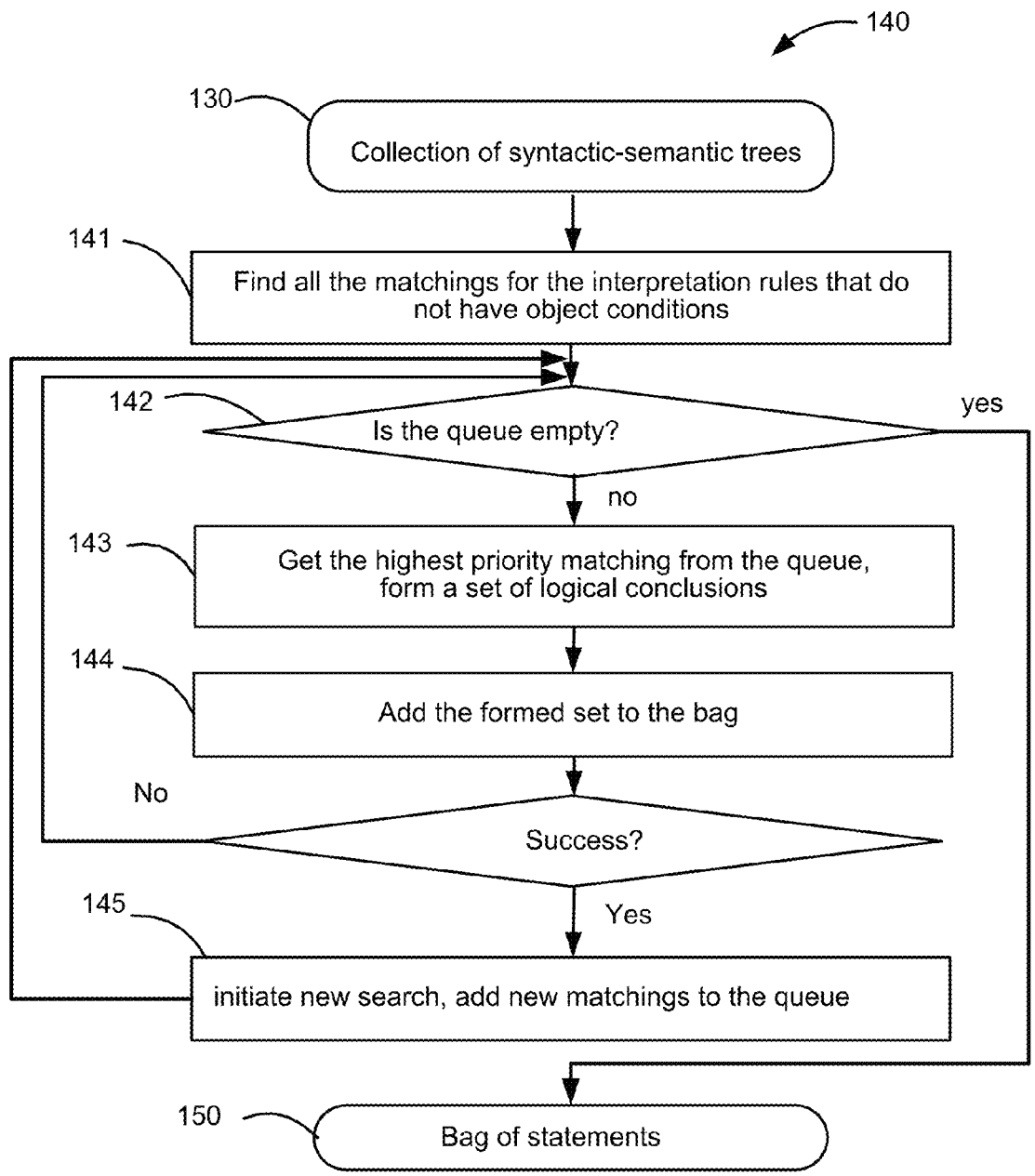
FIG. 1C is a block diagram illustrating applying production rules to a sequence of semantic structures.

Therefore, turning back to FIG. 1A, the information extraction algorithm has the following steps:

Preliminary step 120—analyze the input text 100 with the parser to get a forest of syntactic-semantic parse trees. The next steps are shown on FIG. 1C. Step 141—find all the matchings for the interpretation rules that do not have object conditions. Add the matchings to the sorted match queue. If the queue is empty (step 142), terminate the process. If the queue is not empty—get the highest priority matching from the queue at step 143. Convert the right-hand side of the corresponding rule into a group of statements. At step 144 the system tries to add the statements to the bag of statements. If failed, declare matching invalid and go to step 142. If succeeded, initiate new matchings' search at step 142. If new matchings are found, add the new matchings to the queue and go to step 142.

Steps 141 and 145 are performed with the help of a special matching mechanism. This mechanism at step 141 can retrieve all the matchings for the interpretation rules without object conditions. It also constantly monitors the contents of the bag of statements. Every time step 144 is performed successfully and new statements get into the bag, the mechanism takes them into account and, if necessary, generates new matchings for the rules that do contain object conditions. These new matchings can be created both for the rules that have already been matched before and for those which remained unmatched until that moment. The former occurs when an object condition of a certain rule is matched by more than one object. In this case each object is matched in a separate matching. At step 145 not only matching for interpretation rules, but also matching for identification rules are searched.

Figure 12:
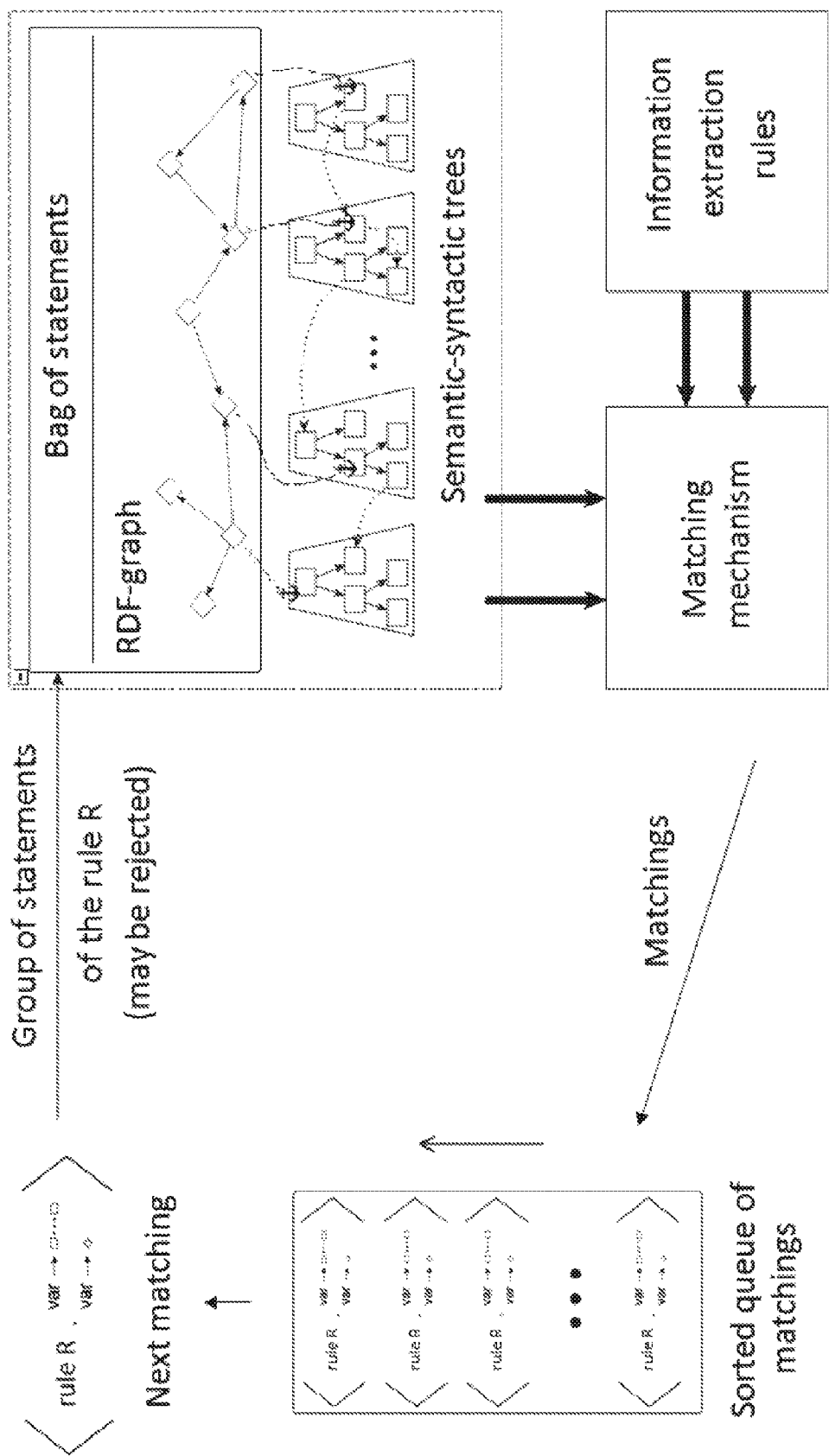
FIG. 12 is a schematic illustration of a method of extracting information according to an embodiment of the present invention.

FIG. 12 schematically illustrates the process of extracting information. The implementation of the matching mechanism is relatively complex. For instance, it has a built-in bytecode interpreter for the compiled rules, a system of indexes for the syntactic-semantic trees, a module for tracking changes in the bag of statements and several other features. Full-length description of this mechanism is beyond the scope of the paper.

It is also important to explain the way the queue of matchings is sorted at step 145. In some cases developers can set the order of rules, i.e. there is partial order over the whole set of rules. Of any two rules one can be given priority over the other. It means that if both rules are ready to be applied, the rule with the higher priority should go first. For convenience reasons we also support group ordering of rules. If group A was given priority over group B, then each rule belonging to group A has higher priority than one belonging to group B. Partial order relation is transitive. Correctness of partial order is checked every time a system of rules is compiled. If loops are detected, compilation fails and the user receives an error message. The order of matchings in the queue is always consistent with the partial order set within a system of rules.

This approach differs significantly from those with consecutive execution of rules, since partial order only determines the priority of rules and does not prevent repeated execution.

It is easy to see that the described algorithm does not consider alternatives. If a group of statements derived from some matching is inconsistent with the bag of statements in its current state, the matching is simply dismissed. We can afford to use this 'greedy' principle because the parser performs word-sense disambiguation, so we rarely ever have to hypothesize about a node. There are some exceptions like words unknown to the parser, but for such cases we have special methods of dealing with these words and incorporating them in our "greedy" model.

Figure 13:
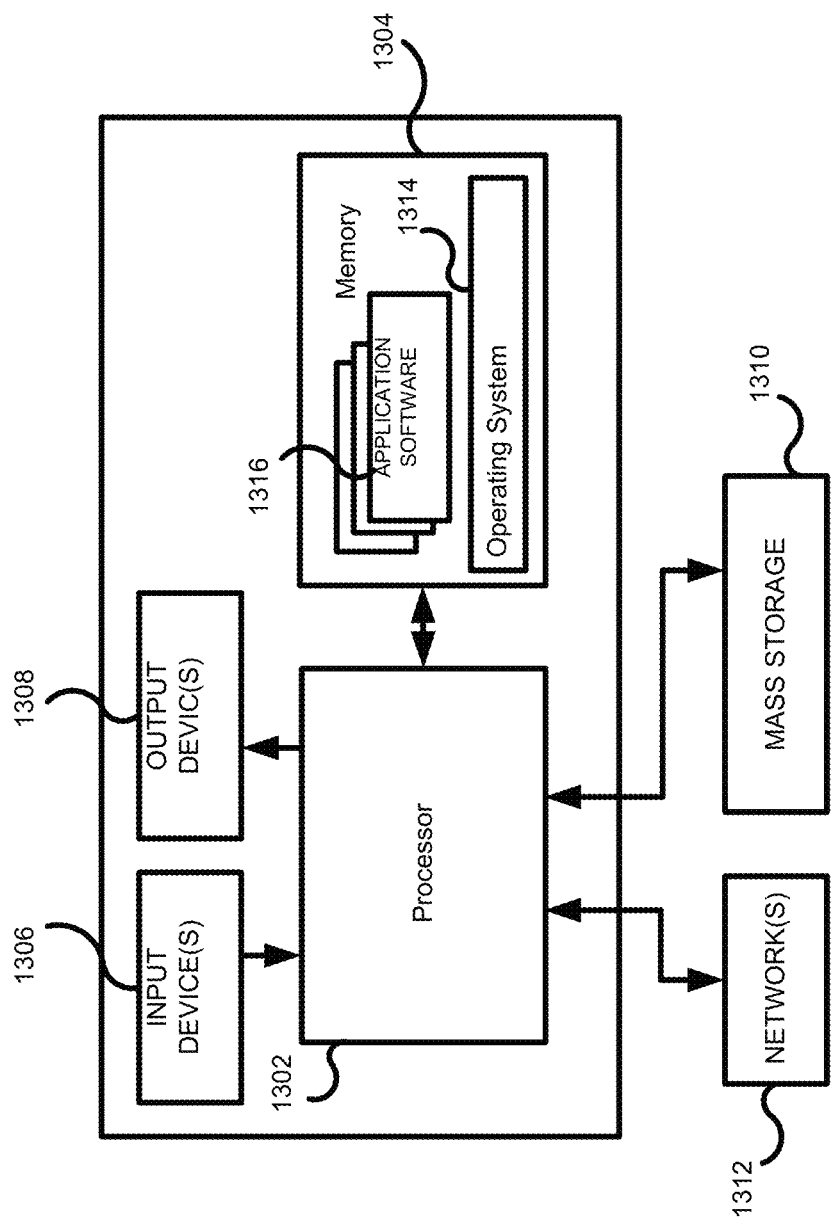
FIG. 13 is an illustration of a system according to an embodiment of the present invention.

FIG. 13 shows exemplary hardware for implementing the techniques and systems described herein, in accordance with one implementation of the present disclosure. Referring to FIG. 13, the exemplary hardware includes at least one processor 1302 coupled to a memory 1304. The processor 1302 may represent one or more processors (e.g. microprocessors), and the memory 1304 may represent random access memory (RAM) devices comprising a main storage of the hardware, as well as any supplemental levels of memory, e.g., cache memories, non-volatile or back-up memories (e.g. programmable or flash memories), read-only memories, etc. In addition, the memory 1304 may be considered to include memory storage physically located elsewhere in the hardware, e.g. any cache memory in the processor 1302 as well as any storage capacity used as a virtual memory, e.g., as stored on a mass storage device 1310.

The hardware also typically receives a number of inputs and outputs for communicating information externally. For interface with a user or operator, the hardware \ may include one or more user input devices 1306 (e.g., a keyboard, a mouse, imaging device, scanner, microphone) and a one or more output devices 1308 (e.g., a Liquid Crystal Display (LCD) panel, a sound playback device (speaker)). To embody the present invention, the hardware typically includes at least one screen device.

For additional storage, the hardware may also include one or more mass storage devices 1310, e.g., a floppy or other removable disk drive, a hard disk drive, a Direct Access Storage Device (DASD), an optical drive (e.g. a Compact Disk (CD) drive, a Digital Versatile Disk (DVD) drive) and/or a tape drive, among others. Furthermore, the hardware 1400 may include an interface with one or more networks 1312 (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces between the processor 1302 and each of the components 1304, 1306, 1308, and 1312 as is well known in the art.

The hardware operates under the control of an operating system 1314, and executes various computer software applications, components, programs, objects, modules, etc. to implement the techniques described above. Moreover, various applications, components, programs, objects, etc., collectively indicated by application software 1316 in FIG. 13, may also execute on one or more processors in another computer coupled to the hardware via a network 1312, e.g. in a distributed computing environment, whereby the processing required to implement the functions of a computer program may be allocated to multiple computers over a network.

In general, the routines executed to implement the embodiments of the invention may be implemented as part of an operating system or a specific application, component, program, object, module or sequence of instructions referred to as a "computer program." A computer program typically comprises one or more instruction sets at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally to actually effect the distribution regardless of the particular type of computer-readable media used. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks (DVDs), flash memory, etc.), among others.

Another type of distribution may be implemented as Internet downloads.

Aspects of the present disclosure have been described above with respect to techniques for machine interpretation of information in text documents. However, it has been contemplated that portions of this disclosure may, alternatively or additionally, be implemented as separate program products or elements of other program products.

All statements, reciting principles, aspects, and embodiments of the disclosure and specific examples thereof are intended to encompass both structural and functional equivalents of the disclosure.

It will be apparent to those skilled in the art that various modifications can be made in the devices, methods, and program products of the present disclosure without departing from the spirit or scope of the disclosure. Thus, it is intended that the present disclosure includes modifications that are within the scope thereof and equivalents.

What is claimed is:

1. A method comprising:
    performing, by a processor, semantic/syntactic analysis for sentences of a text document to construct semantic-syntactic structures for the sentences;
    applying, by the processor, production rules to the semantic-syntactic structures to generate a set of logical conclusions about information objects in the text document, wherein the production rules are based on linguistic characteristics of the semantic-syntactic structures, lexical-morphological properties of the semantic-syntactic structures, and ontologies of subject matters for the sentences, wherein the production rules comprise interpretation rules and identification rules, wherein the interpretation rules specify fragments to be found in the semantic-syntactic structures, wherein the interpretation rules specify corresponding logical statements that form the set of logical conclusions in response to finding the fragments in the semantic-syntactic structures, and wherein the identification rules are used to merge ones of the information objects;
    using, by the processor, the set of logical conclusions about the information objects in the text document to build an ontology-based Resource Definition Framework (RDF) graph; and
    storing the ontology-based RDF graph in a storage device and providing searching of the stored ontology-based RDF graph as a knowledge base reference.

2. The method of claim 1, wherein performing the semantic/syntactic analysis further comprises performing lexical-morphological analysis of the text document to construct the semantic-syntactic structures for the sentences.

3. The method of claim 2, further comprising performing rough syntactic analysis of the text document to construct a graph of generalized constituents, wherein the graph of generalized constituents comprises potential lexical meanings of words in the sentences and potential syntactic slots expressing types of relationships between the potential lexical meanings of the words.

4. The method of claim 3, further comprising performing precise syntactic analysis of the graph of generalized constituents, wherein the graph of generalized constituents comprises syntactic-semantic dependency parse trees for the sentences, and wherein performing the precise syntactic analysis comprising identifying ones of the syntactic-semantic dependency parse trees that have highest probabilities of expressing meanings for the sentences.

5. The method of claim 4, further comprising constructing the semantic-syntactic structures which are language independent, wherein the words in the sentences are represented in the semantic-syntactic structures by sematic classes that are language independent, and wherein the semantic classes comprises attributes that express lexical, syntactic, and semantic properties of the words in the sentences.

6. The method of claim 1, wherein applying the production rules further comprises identifying matching ones of the interpretation rules, among the production rules, that do not have object conditions, wherein object conditions indicate types of the information objects assigned to corresponding ones of the interpretation rules for application of the corresponding ones of the interpretation rules to portions of syntactic-semantic dependency parse trees for the sentences, and wherein the logical statements are true for the sentences if the fragments are matched with portions of syntactic-semantic dependency parse trees.

7. The method of claim 6, further comprising adding the matching ones of the interpretation rules to a sorted matching queue.

8. The method of claim 7, further comprising terminating applying the production rules in response to determining that the sorted matching queue is empty.

9. The method of claim 7, further comprising, in response to determining that the sorted matching queue is not empty, selecting a highest priority matching from the matchings in the sorted matching queue to generate the set of logical conclusions from ones of the logical statements corresponding to the highest priority matching, and conditionally adding the set of logical conclusions to a bag of statements, wherein using the set of logical conclusions to build the ontology-based RDF graph comprises converting the bag of statements to the ontology-based RDF graph.

10. The method of claim 9, further comprising searching for new matchings in response to determining that conditionally adding the set of logical conclusions to the bag of statements is successful.

11. The method of claim 9, further comprising declaring the set of logical conclusions invalid and terminating applying the production rules in response to determining that conditionally adding the set of logical conclusions to the bag of statements fails.

12. A system comprising:
    a processor; and
    a memory storing instructions that, when executed by the processor, cause the processor to:
        perform semantic/syntactic analysis for sentences of a text document to construct semantic-syntactic structures for the sentences;
        apply production rules to the semantic-syntactic structures to generate a set of logical conclusions about information objects in the text document, wherein the production rules are based on linguistic characteristics of the semantic-syntactic structures, lexical-morphological properties of the semantic-syntactic structures, and ontologies of subject matters for the sentences, wherein the production rules comprise interpretation rules and identification rules, wherein the interpretation rules specify fragments to be found in the semantic-syntactic structures, wherein the interpretation rules specify corresponding logical statements that form the set of logical conclusions in response to finding the fragments in the semantic-syntactic structures, and wherein the identification rules are used to merge ones of the information objects;

use the set of logical conclusions about the information objects in the text document to build a Resource Definition Framework (RDF) graph; and store the ontology-based RDF graph in a storage device and provide searching of the stored ontology-based RDF graph as a knowledge base reference.

13. The system of claim 12, wherein portions of one or more of the performance of the semantic/syntactic analysis, the application of the production rules, or the use of the set of logical conclusions are performed using the computer language Web Ontology Language (OWL).

14. The system of claim 12, further comprising a database to store the semantic-syntactic structures.

15. A non-transitory computer-readable medium storing instructions that, when executed by a processor, cause the processor to:

perform, by the processor, semantic/syntactic analysis for sentences of a text document to construct semantic-syntactic structures for the sentences;

apply, by the processor, production rules to the semantic-syntactic structures to generate a set of logical conclusions about information objects in the text document, wherein the production rules are based on linguistic characteristics of the semantic-syntactic structures, lexical-morphological properties of the semantic-syntactic structures, and ontologies of subject matters for the sentences, wherein the production rules comprise interpretation rules and identification rules, wherein the interpretation rules specify fragments to be found in the semantic-syntactic structures, wherein the interpretation rules specify corresponding logical statements that form the set of logical conclusions in response to finding the fragments in the semantic-syntactic structures, and wherein the identification rules are used to merge ones of the information objects;

use, by the processor, the set of logical conclusions about the information objects in the text document to build a Resource Definition Framework (RDF) graph; and store the ontology-based RDF graph in a storage device and provide searching of the stored ontology-based RDF graph as a knowledge base reference.

16. The medium of claim 15, wherein the instructions are further to cause the processor to perform portions of one or more of the performance of the semantic/syntactic analysis, the application of the production rules, or the use of the set of logical conclusions using the computer language Web Ontology Language (OWL).

* * * * *